Dec. 11, 1951   T. F. S. HARGREAVES ET AL   2,577,755
ALTERNATING CURRENT SIGNALING SYSTEM
Filed April 27, 1948   5 Sheets-Sheet 1

INVENTORS
THOMAS F. S. HARGREAVES
WILLIAM F. GOULD
BY
R. P. Morris
ATTORNEY

Dec. 11, 1951  T. F. S. HARGREAVES ET AL  2,577,755
ALTERNATING CURRENT SIGNALING SYSTEM
Filed April 27, 1948  5 Sheets-Sheet 2
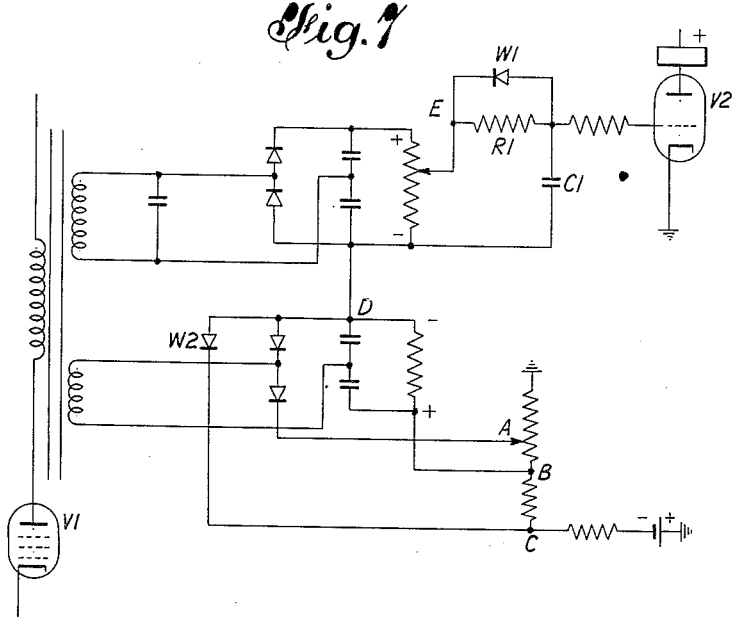
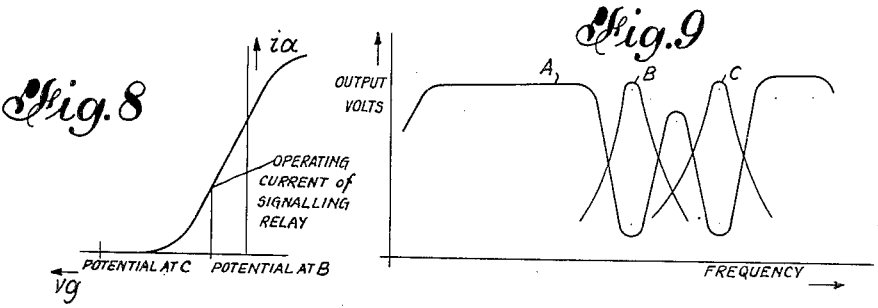
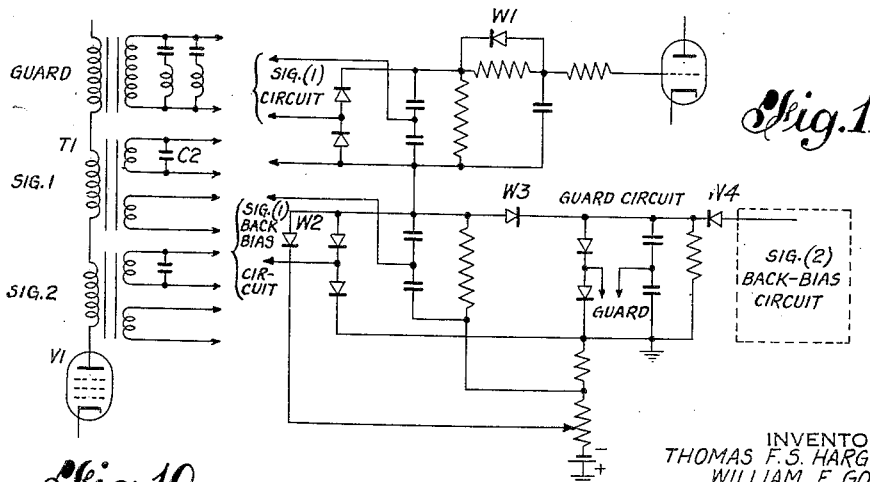
INVENTORS
THOMAS F. S. HARGREAVES
WILLIAM F. GOULD
BY
ATTORNEY Dec. 11, 1951     T. F. S. HARGREAVES ET AL     2,577,755
ALTERNATING CURRENT SIGNALING SYSTEM
Filed April 27, 1948     5 Sheets-Sheet 5

INVENTORS
THOMAS F. S. HARGREAVES
WILLIAM F. GOULD
BY
ATTORNEY

Patented Dec. 11, 1951

2,577,755

UNITED STATES PATENT OFFICE 2,577,755

ALTERNATING-CURRENT SIGNALING SYSTEM

Thomas Frederick Stanley Hargreaves and William Frederick Gould, London, England, assignors to International Standard Electric Corporation, New York, N. Y.

Application April 27, 1948, Serial No. 23,438
In Great Britain April 30, 1947

24 Claims. (Cl. 179—84)

This invention relates to electrical signalling systems, with particular reference to voice frequency receivers therefor.

In our prior application No. 3,712/47 (Hargreaves-Gould 6-2) we have described various arrangement for voice frequency signalling over long distance telephone networks in which the signal receiver is connected in the incoming end of a four-wire channel at a point before the 4-wire/2-wire termination, instead of in the 2-wire line, which is the position which has been used hitherto.

The present invention is concerned with a form of voice frequency receiver which is particularly adapted for use in such a 4-wire system, although it is not limited to use therein, and may be used equally well in the 2-wire line of such a system, or in a conventional 2-wire transmission system.

According to the invention, there is provided a voice frequency receiver adapted to respond to pure signals and to reject impure signals, which comprises rectifying means adapted to respond to pure signal frequency current only to generate two D. C. signals, which are substantially in phase with one another but of opposite polarity and which have substantially different amplitudes, means for combining the two signals into a single signal and guard means for rendering an apparent signal ineffective if frequencies other than signal frequency are present to a predetermined extent.

The invention also comprises a voice frequency receiver adapted to respond to pure signals and to reject impure signals which comprises rectifying and shaping means adapted to respond to pure signal frequency current only to generate two D. C. signals which are substantially in phase with one another but of opposite polarity, which have substantially different amplitude and substantially different rising and decaying characteristics, and means for combining the two signals into a single signal having substantially similar duration characteristic to that of the initially received pure signal.

The invention further comprises a voice frequency receiver adapted to respond to pure signals and to reject impure signals, which comprises rectifying means adapted to respond to pure signal frequency current to generate two D. C. signals which are substantially in phase with one another, but of opposite polarity, and of which one is of substantially greater amplitude than the other; further rectifying means adapted to respond principally to other than signal frequency current to generate a guarding D. C. signal which is of the same polarity as the smaller of the said two D. C. signals generated from signal frequency current; and discriminating means for preventing the said guarding D. C. signal being combined with the said D. C. signal of opposite polarity for transmission to a subsequent signal repeating device unless its amplitude exceeds a predetermined proportion of that of the said signal of opposite polarity: whereby if impure signals are received the resultant signal current available for actuating a subsequent signal responding device is insufficient to operate the device, whereas the resultant signal current when pure signals are received is sufficient to operate the device.

The circuits illustrated in the embodiments of the invention hereinafter described, for the most part utilize rectified currents in the various control operations. The output voltage of any rectifier is composed of a D. C. voltage and an alternating or ripple component. The composite voltage, however, has from common usage been termed a "direct current voltage" or a "pulsing direct current voltage." In the descriptive material which follows, it is to be understood that reference to the "phase" of such "direct current" refers to the phase of the alternating component or more particularly to the time relationship existing between the maximum magnitures of such voltages, whether of the same or opposite polarity.

The invention will be described in relation to a preferred embodiment of a 2 V. F. receiver for use in the receiving channel of a 4-wire line, and illustrated in the figures of the accompanying drawing.

In the drawing:

Fig. 7 shows the schematic of Fig. 6 with various refinements added;

Fig. 8 shows the anode current v. grid potential relationship in the D. C. amplifier of Fig. 7;

Fig. 9 shows the relationship existing between the sensitivities of the guard circuit and signal circuit for a 2-frequency receiver;

Fig. 10 illustrates schematically the derivation of the necessary signal and guard circuit potentials in the anode circuit of the common amplifier, while Fig. 11 shows schematically the addition of the guard circuit in part of a two frequency receiver;

*Signal receiving circuits*

Figure 1:
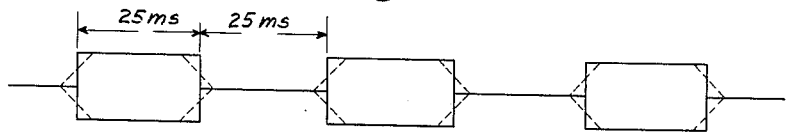
Fig. 1 represents in idealised form a transmitted wave and (dotted) a received wave.

A typical signal which a voice frequency receiver is required to pass on in a D. C. form is shown in Fig. 1.

The pulses of tone comprising a signal may consist of either the X or the Y frequency and level differences between the two frequencies may be as much as 6 db. In addition to receiving pulses of single frequency, the receiver also has to accept pulses of compound frequency.

A single frequency, or a pure frequency must, of course, be interpreted as including a narrow band of frequencies on either side of the single frequency in question, the effective width of such band depending on the degree of selectivity achieved. In the case of simple resonant and anti resonant circuits, this effective width df. is relatively large, and dependent on the frequency $f$ in question.

The transmitted signal is shown by the full lines and the received signal by the dotted lines, and the points of zero distortion in time are approximately half way up the received signal envelopes.

It is obvious from this that if the first amplifying stage of the receiver is a voltage limiter then distortion will be produced because the "operating point" will be moved up or down the received signal envelope towards the axis. Moreover when a compound frequency signal is being received limiting would cause intermodulation between the two frequencies and the products of intermodulation would appear in any guard circuit provided and prevent satisfactory operation of the receiver. Thus the first stage of the receiver must be a straight amplifier with no limiting, and this is particularly true in the case of a signal receiver employing a common amplifier for speech and signal amplification since it is impossible to use any form of limiting in the speech path in such a case.

Figure 2:
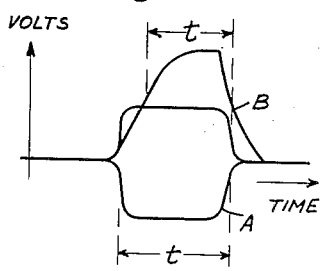
Fig. 2 represents the waveform of a received wave, and the output wave form from a voltage doubler to which the input wave is applied.

When the incoming signal is amplified without limiting and applied to a rectifier circuit with similar build up and decay times then the D. C. voltage produced is similar to that shown in Fig. 2, where curve A represents the actual received signal, and curve B the rectified voltage produced.

Here again, the point of zero time distortion is half way up the D. C. voltage envelope.

Figure 3:
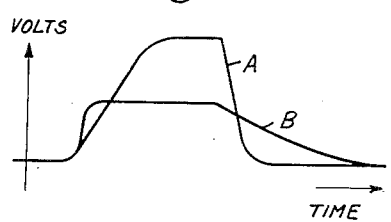
Fig. 3 represents the wave forms of outputs from two voltage doublers handling signals derived from the same source, but with different amplitudes and different rise and decay characteristics.

Thus when operating a receiver with varying input levels it is necessary to arrange that the operating point of the final relay or D. C. amplifier occurs half way up the rectified signal voltage envelope. This is achieved by connecting a rectified output, derived from the signal circuit, in opposition to the main signal rectified output, this opposition or back bias voltage being half the amplitude of the main signal voltage, and having a quicker build up and slower decay time, than the main signal voltage, as indicated in Fig. 3. In this figure, curve A represents the main signal voltage, and curve B the back bias voltage.

Figure 4:
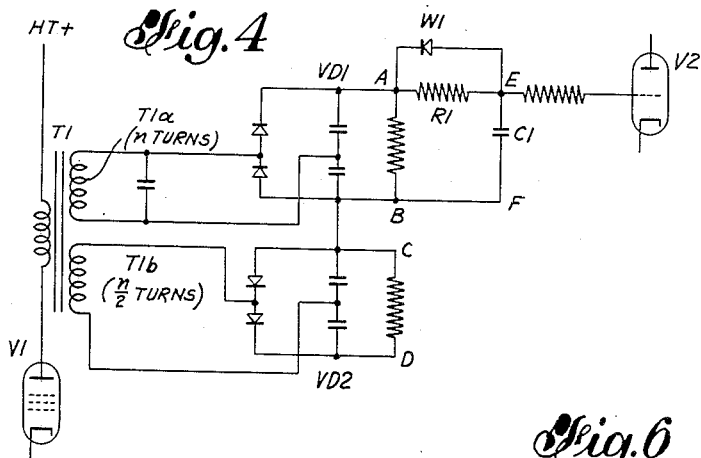
Fig. 4 is a schematic of part of a receiver for carrying out the process represented in Fig. 3.

Detailed circuit arrangements for producing signal and back bias voltages of this form are shown in Fig. 4.

In this figure, a receiving amplifier valve VI is shown coupled by means of a double-secondary output transformer T1 to two voltage doubler circuits VD1 and VD2. The two secondaries T1a and T1b have their turns in the ratio of 2:1 respectively, and T1a is tuned to anti-resonance at the signal frequency in question by the condenser C2.

The voltage doubler circuits produce, as will be seen, opposing voltages at A—B and C—D respectively, and these voltages combine subtractively to control the output current of D. C. amplifier valve V2, the voltage at A—B being further modified in the circuit comprised by W1-R1-C1.

Figure 5:
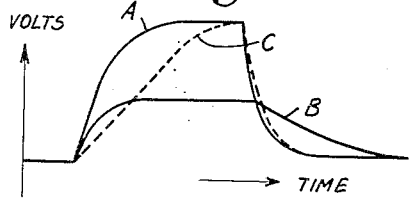
Fig. 5 represents the wave forms existing at various points in Fig. 4.

The voltage wave shapes developed at various points of the circuit are shown in Fig. 5. The voltage at A—B (curve A) builds up at the same rate as the voltage at C—D (curve B) since both rectifier circuits are fed from the same transformer. The voltage produced at A—B, however, is used to charge the condenser C1 through resistance R1 and hence the voltage at E—F (curve C) rises more slowly than the voltage at C—D. Hence the effective voltage applied to the grid of the D. C. amplifier which is the differences between the voltages at E—F and at C—D comprises a back bias voltage building up more quickly and decaying more slowly than the voltage from the signal circuit. The rectifier W1 is included in order to enable the condenser C1 to discharge quickly at the end of the pulse, which would not be necessary if it were possible to give the back bias circuit a very long hangover time. This, however, is not possible because (a) longer hangover time would imply longer build up-time, (b) it is desirable that each pulse of signal which comes along should be treated individually, which means that the back bias must decay by a reasonable amount, say 12db, between pulses of signal, and since the minimum spacing is 25 milliseconds it is not possible to give the back bias a longer hangover time than about 15 milliseconds; this also has the advantage that when a train of impulses is received the first pulse is treated in exactly the same way as the remaining pulses.

Using the circuit already shown (Fig. 4), it is found that if the signal voltage versus input level is plotted (curve A, Fig. 6) and also twice the back bias voltage versus input level (curve B), a constant potential difference is found which substantially changes the 2:1 signal-to-back-bias ratio at low input levels. This potential is due to the difference in "contact potential" of the rectifiers in the signal circuit and the rectifiers in the back-bias circuit, and the circuit must therefore be arranged to compensate for this potential. In addition, it is necessary to apply a steady D. C. bias to the D. C. amplifier in order to maintain it well beyond cut-off during the idle periods, but capable of being operated about its correct grid bias point when signals are being received particularly at low input levels.

The arrangements for doing this are shown in Fig. 7, which is otherwise similar to Fig. 4.

During the idle condition when no signal is being received the rectifier W2 holds the point D at the same potential as point C and valve W2 is biassed back beyond cut-off. As soon as the back bias circuit produces sufficient voltage to overcome the potential drop between B and C the rectifier W2 is biassed ineffective and the valve V2 comes under the control of the signal and back bias circuits. This is shown graphically in Fig. 8, the reference potential being that of point B which is the correct grid bias point of valve V2 to operate the signalling relay in its anode circuit.

The potential between points A and B puts a back bias on the signal back bias circuit rectifiers and compensates for the difference in "contact potential" of the rectifiers in the signal and back-bias circuits previously referred to. Ideally the potential at both A and B should be variable but in practice it is only necessary to vary one of them as shown. Also the connection at point E should be made to a potentiometer across the signal circuit, as shown in the figure. Then with high level signals, since the reference potentials are small compared to the signal voltages, this potentiometer can be used to set the signal-to-back-bias ratio correct, and at low input levels, the valve bias point may be set to give correct operation together with the delay volts on the back-bias rectifiers. Another possible method of adjustment is to connect the point A to earth and have a fixed potential on the back bias rectifiers to compensate for rectifier "contact potential," adjusting the valve bias by means of a resistance in the cathode lead.

Guard circuit arrangements

A suitable signalling receiver comprises a separate signalling circuit for each signalling frequency to be received, and a guard circuit to prevent or reduce the liability of false operation from spurious frequencies.

The amplitude-frequency characteristic of the guard circuit proposed for this receiver is shown at curve A, Fig. 9. The kind of response aimed at is a "flat guard" over the working range of the receiver suppressed at the signal frequencies (curves B and C), the maximum guard amplitude obtainable being approximately the same as the maximum signal amplitude.

The guard circuit thus responds principally to frequencies other than signal frequency or frequencies, having regard to the limitation imposed by the definition (above) of "pure" or single frequency.

Figure 6:
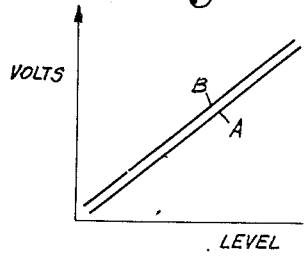
Fig. 6 illustrates a discrepancy which exists between the two signal waves of Fig. 3.

The curves of Fig. 9 presuppose a 2 V. F. receiver, and the A. C. circuit arrangement for producing the guard characteristic in such a receiver is shown in Fig. 10, the inter-connection of the signal and guard circuit rectifiers being shown in Fig. 11, where similar elements to those used in Figs. 4 and 6 are shown with similar reference letters.

Figure 12:
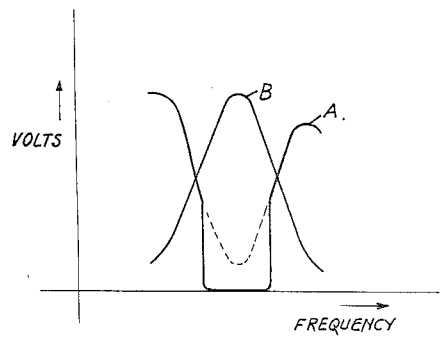
Fig. 12 illustrates the modification to the guard circuit response curve to reduce the effects of guard leakage.

It will be noticed that the guard and signal back-bias circuits are connected in parallel via the rectifier W3, or W4, as the case may be, for signal 1 or signal 2 circuits respectively. This ensures that the guard circuit is not effective until it has exceeded half the signal voltage that is present. In this way the guard circuit is given an amplitude frequency characteristic modified as shown by full line A in Fig. 12, which has the advantage that during signalling the guard circuit leakage does not affect the signal-to-back-bias ratio, this condition holding for "off-signal frequencies" as well as for the exact signalling frequencies. In addition, the rise in guard leakage when two or more frequencies are present again has no adverse effect on the signal-to-back-bias ratio which ensures good impulsing at "off frequencies" and with compound frequencies.

Figure 13:
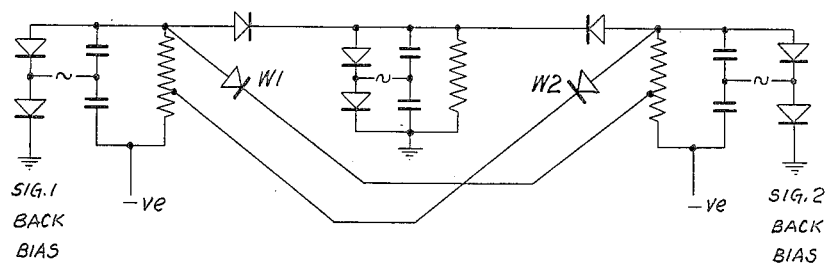
Fig. 13 illustrates a desirable modification to the signal back bias circuits in a 2-frequency receiver.

Using the type of guard circuit shown in Fig. 11 it is possible for one of the signal circuits in a compound frequency receiver to operate from leakage currents from the other signal frequency or frequencies if at a high level owing to the limitations imposed by a single resonant circuit for filtering purposes. This difficulty can be overcome by interconnecting the respective signal back-bias circuits by means of two rectifiers W1 and W2 as shown in the Fig. 13. In this way part of the back-bias from one signal circuit is fed to the other signal back bias circuit, the magnitude being such as more than to oppose the voltage produced in the signal circuit by leakage currents due to insufficient selectivity in the signal filtering circuits. It is also possible to set in this manner the maximum difference in received levels of the signal frequencies that the receiver will accept.

Figure 14:
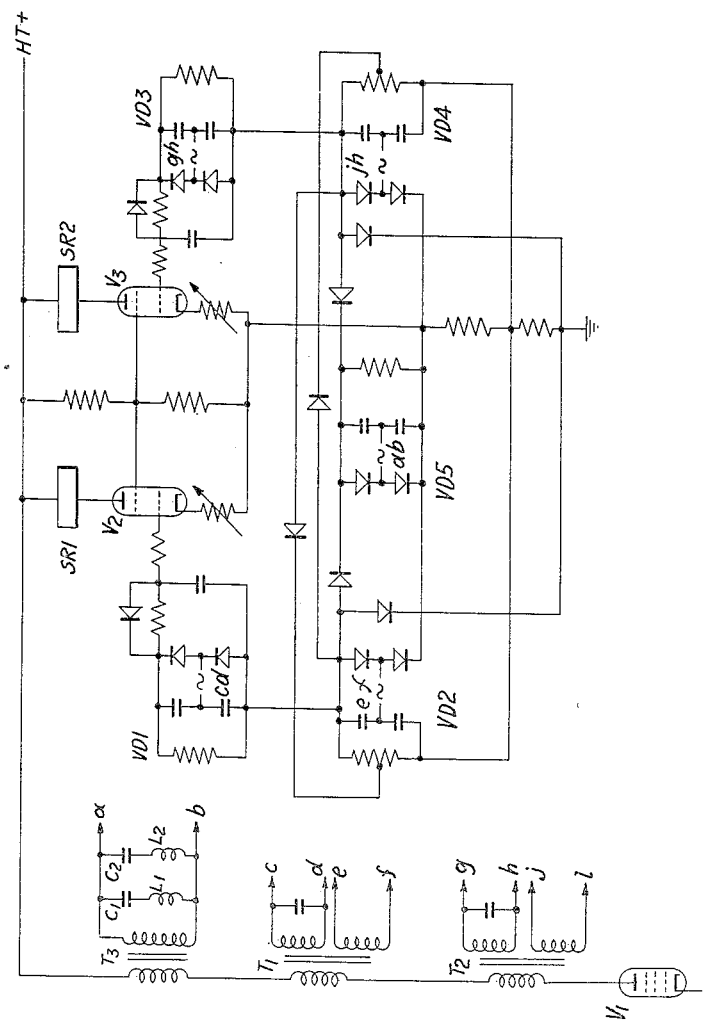
Fig. 14 shows the composite schematic circuit of a complete 2-frequency receiver.

Fig. 14 shows the complete schematic of a receiver for use in a two frequency signalling system, designed according to the foregoing analysis.

V1 represents a common signal-amplifying valve for the receiver alone (without regard to the speech channel), and V2 and V3 are the signalling D. C. amplifier valves passing on the selected and amplified signals to the relays SR1 and SR2 respectively. T1 and T2 are the double-secondary tuned output transformers for selecting current of approximately the respective signalling frequencies, while T3 with its single secondary shunted by the two resonant circuits L1-C1, L2-C2, provides guard circuit voltage.

The main signal circuit voltage-doublers are shown at VD1 and VD3 respectively, the corresponding back-bias doublers being VD2 and VD4 respectively, while the guard circuit doubler is VD5.

The various inter-connecting rectifiers and steady bias circuits required are not described explicitly, being strictly in conformity with the earlier description, except to point to the use of bias resistors in the cathodes of V2 and V3 for providing steady-cut-off biasses for these valves. This alternative was envisaged in the discussion of the signal circuits.

Although the receiver has been described in relation to an arrangement employing a D. C. amplifier and a relay, the amplifier could, if desired, be dispensed with, and the composite signal be applied direct to a suitably sensitive relay.

Further, the main signal bias and the back bias (with guard bias, if any) could be combined in the relay itself by the use of a double-wound relay, but clearly either of these arrangements would demand a very sensitive relay and/or a good signal level.

Figure 15:
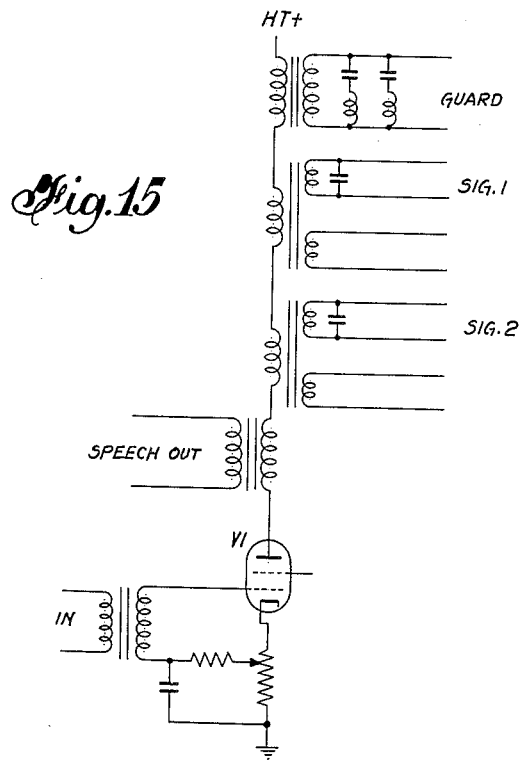
Figs. 15 and 16 show schematically two forms of connection for a 2-frequency receiver employing a combined speech and signal amplifying valve.
Figure 16:
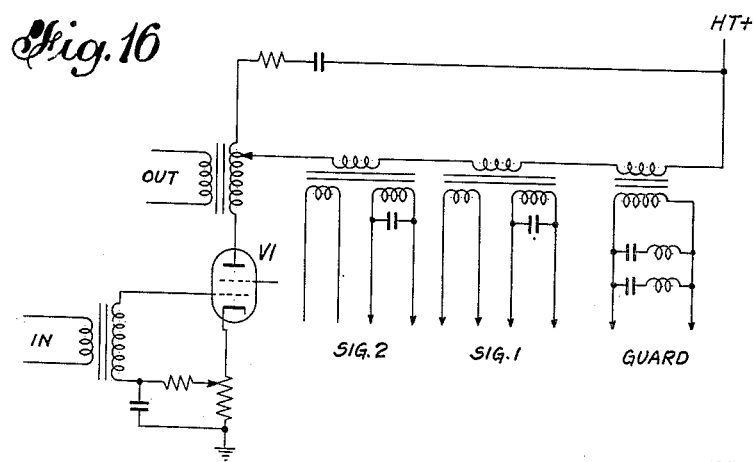

Figs. 15 and 16 show alternative forms of connection particularly for use in receivers connected in the receiving channel of a 4-wire line, where a common speech and signal amplifier valve is used, as described in our aforementioned patent application No. 3,712/47.

In Fig. 15, the speech output circuit and the signal and guard circuits are all in series in the anode circuit of the common amplifier valve VI, and reliance is placed on the high anode impedance of VI, to prevent effective interference of the signalling circuits by near-end speech received backwards over the speech output circuit from the 4-wire/2-wire network (not shown in this figure).

In Fig. 16 is shown the alternative arrangement in which the primary of the speech output transformer TI is tapped and adapted by means of the resistive connection RI at its top end to form a hybrid circuit having Wheatstone bridge characteristics. Thus the receiver portion is made conjugate to the speech output path by careful balancing of the anode resistance against RI, and transfer of near-end speech is effectively prevented.

Summing up, the chief characteristics of the receiver are:

(1) A signal circuit which consists of a forward driving circuit and a backward driving circuit, the difference in potential thereby produced being applied to a valve or a relay which detects the presence of the signal. The backward driving circuit is arranged to have a quicker build up time and slower decaying time than the forward driving circuit, and the ratio between forward and backward driving circuits is set to give good impulsing; in general, this ratio is about 2:1.

(2) The guard circuit is arranged to have an essentially flat amplitude-frequency characteristic over the working range of the receiver except at the signal frequencies, where it is suppressed. (The flat guard is not vital and the circuit will work with any form of tuned guard.)

(3) The guard and signal backward circuits are connected in parallel in such a way that the guard circuit is not effective until its amplitude exceeds the amplitude of the backward driving signal circuit. In this way when signals are present, the signal circuits take control and are not influenced by the guard circuits. The ratio of guard to signal volts produced can be any convenient value suitable to the design, the upper ratio being fixed by line noise considerations and the amount the guard can be suppressed at the signalling frequencies.

(4) By parallel connection of the back driven signal circuits in a similar manner to the guard circuit, false operation of a signal circuit by leakage from another signal frequency due to imperfections in the signal selective circuits can be prevented. And further, it is possible to control by this means the amount of variation in the respective signal levels which can be tolerated.

(5) The arrangement described of the signal and guard circuits is not particular to a two frequency receiver, and could be applied to a single frequency receiver or even to a three or more frequency receiver. Moreover this arrangement could be used on a receiver which has an amplifier having A. V. C., as well as on a receiver with a linear amplifier.

What is claimed is:

1. In a communication system wherein intelligence signals are transmited in a predetermined frequency band and another signal is transmitted at a predetermined frequency in said band, a receiver comprising means for selecting said other signal, means for producing from said selected signal two opposing signals of substantially the same time relation, one of said opposing signals having predetermined rise and decay times and the other of said opposing signals having rise and decay times respectively shorter and longer than the rise and decay times of said one opposing signal, and voltage amplitude responsive utilization means connected to said producing means and selectively responsive to said opposing signals.

2. In a communication system wherein intelligence signals are transmitted in a predetermined frequency band and another signal is transmitted at a predetermined frequency in said band, a receiver comprising means for selecting said other signal, means for producing from said selected signal two opposing signals of substantially the same time relation, one of said opposing signals having predetermined rise and decay times and a greater maximum amplitude than the other of said opposing signals and the other of said opposing signals having rise and decay times respectively shorter and longer than the rise and decay times of said one opposing signal, and voltage amplitude responsive utilization means connected to said producing means and responsive to signal voltage exceeding a predetermined amplitude.

3. In a communication system wherein intelligence signals are transmitted in a predetermined frequency band and another signal is transmitted at a predetermined frequency in said band, a receiver comprising means for selecting said other signal, means for producing from said selected signal two opposing signals of substantially the same time relation, one of said opposing signals having predetermined rise and decay times and a greater maximum amplitude than the other of said opposing signals and the other of said opposing signals having rise and decay times respectively shorter and longer than the rise and decay times of said one opposing signal, voltage amplitude responsive utilization means connected to said producing means and responsive to signal voltage exceeding a predetermined amplitude, means for selecting signals at frequencies other than said predetermined frequency and means connected to said selecting means and to said utilization means and responsive to said last-mentioned signals for preventing operation of said utilization means 4. A signal receiver responsive to a signal of a selected frequency in a predetermined frequency band and unresponsive to other signals in said band, said signal being periodic and having predetermined rise and decay times and a predetermined duration, said receiver comprising means for selecting and detecting said signal, means connected to said selecting and detecting means for converting said signal into two opposing signals of substantially the same time relation and having predetermined rise and decay times, one of said times of both opposing signals being shorter than said predetermined duration and said one time of one of said opposing signals being different from the corresponding time of the other of said opposing signals, and voltage amplitude responsive utilization means connected to said converting means, said utilization means being responsive to signal voltage of said one opposing signal exceeding a predetermined portion of the amplitude of said other opposing signal.

5. A signal receiver responsive to a signal of a selected frequency in a predetermined frequency band and unresponsive to other signals in said band, said signal being periodic and having predetermined rise and decay times and a predetermined duration, said receiver comprising means for selecting and detecting said signal, means connected to said selecting and detecting means for converting said signal into two opposing signals of substantially the same time relation and having predetermined rise and decay times, one of said times of both opposing signals being shorter than said predetermined duration and said one time of one of said opposing signals being different from the corresponding time of the other of said opposing signals, voltage amplitude responsive utilization means connected to said converting means, said utilization means being responsive to signal voltage of said one opposing signal exceeding a predetermined proportion of the amplitude of said other opposing signal, and means for selecting signals at frequencies in said band other than said selected frequency connected to said utilization means, said last-mentioned selecting means being responsive to said last-mentioned signals and adapted to prevent operation of said utilization means in response to receipt of said last-mentioned signals.

6. A signal receiver responsive to a periodic signal having predetermined rise and decay times and a predetermined duration and comprising means for converting said signal into two opposing signals of substantially the same time relation and having predetermined rise and decay times, one of said times of both opposing signals being shorter than said predetermined duration and said one time of one of said opposing signals being different from the corresponding time of the other of said opposing signals and signal amplitude responsive utilization means connected to said converting means, said utilization means being responsive to signal amplitude of said one opposing signal exceeding a predetermined proportion of the amplitude of said other opposing signal.

7. A signal receiver responsive to a periodic signal having predetermined rise and decay times and a predetermined duration, said receiver comprising means for converting said signal into two opposing signals of substantially the same time relation, one of said opposing signals having predetermined rise and decay times and the other of said opposing signals having rise and decay times respectively shorter and longer than the rise and decay times of said one opposing signal, and signal amplitude responsive utilization means connected to said converting means, said utilization means being responsive to signal amplitude of said one opposing signal exceeding a predetermined portion of the amplitude of said other opposing signal.

8. A signal receiver responsive to a periodic signal having predetermined rise and decay times and a predetermined duration, said receiver comprising means for converting said signal into two opposing signals of substantially the same time relation, one of said opposing signals having predetermined rise and decay times and the other of said opposing signals having rise and decay times respectively shorter and longer than the rise and decay times of said one opposing signal, signal amplitude responsive utilization means connected to said converting means, said utilization means being responsive to signal amplitude of said one opposing signal exceeding a predetermined proportion of the amplitude of said other opposing signal, means for receiving other signals, and means connected to said last-mentioned receiving means and to said utilization means and responsive to said other signals for preventing operation of said utilization means.

9. A signal receiver for receiving pulses of signal having a predetermined frequency comprising frequency selective means for selecting said pulses, means for rectifying said pulses and for converting each pulse into two pulses of substantially the same time relation but opposite polarity and different amplitude and each having leading and trailing edges, means for shaping an edge of each of said two pulses so that one edge of one pulse has a different duration than the corresponding edge of the other pulse, pulse translating means responsive to pulses exceeding in amplitude the pulse of said two pulses having the smaller amplitude, and means coupling said shaping means to said translating means.

10. A signal receiver according to claim 9 further comprising second frequency selective means for selecting signals at frequencies other than said pulse signal frequency, means for rectifying the output of said second means, and means connecting said rectifying means to said translating means in polarity opposition to said pulses exceeding in amplitude the pulse of said two pulses having the smaller amplitude.

11. A signal receiver according to claim 10 wherein the duration of the leading edge of said one pulse is greater than that of the leading edge of said other pulse.

12. A signal receiver according to claim 11 wherein the duration of the trailing edge of said one pulse is less than that of the trailing edge of said other pulse.

13. A signal receiver comprising means for selecting a signal of a predetermined frequency and a predetermined duration, a pair of rectifying circuits coupled to said selecting means, each circuit comprising a rectifier and a constant time responsive circuit, the constant time responsive of one such circuit having a time value different from that of the other circuit and the time value of both circuits being less than said predetermined duration, an amplifier having an input and an output circuit, means for connecting said rectifying circuits in opposition to the input circuit of said amplifier, and signal responsive means connected to the output of said amplifier.

14. A signal receiver according to claim 13 further comprising means for biasing said rectifiers including a source of substantially constant direct current potential.

15. A signal receiver according to claim 13 further comprising means for selecting signals at frequencies other than said predetermined frequency, a further rectifying circuit coupled to said last mentioned means, and means for coupling the output of said further rectifying circuit to the input of said amplifier in opposition to the output of one of said pair of rectifying circuits.

16. A signal receiver comprising means for selecting a signal of a predetermined frequency, a pair of rectifying circuits coupled to said selecting means, one of said rectifying circuits comprising a rectifier and a load circuit, said rectifier and load circuit forming a time constant circuit whose charging time is inherently greater than its discharge time, the other of said rectifying circuits comprising a rectifier and a load circuit, said last mentioned rectifier and said last mentioned load circuit forming a time constant circuit whose charging time is inherently less than the charging time of the other time constant circuit and whose discharging time is inherently greater than the discharging of the other time constant circuit, an amplifier having an input control circuit and an output, means for connecting the outputs of said rectifying circuits in series opposition and to the input circuit of said amplifier, and a relay connected in the output of said amplifier.

17. A signal receiver according to claim 16 further comprising means for selecting signals at frequencies other than said predetermined frequency, a further rectifying circuit coupled to said last mentioned means, and means for coupling the output of said further rectifying circuit to the input circuit of said amplifier in opposition to the output of said one rectifying circuit.

18. A signal receiver comprising a pair of amplifiers, each amplifier having input and output circuits, each of said input circuits comprising means for selecting a signal of a predetermined frequency, the selecting means of one of said input circuits selecting a signal having a frequency different from the frequency of the signal selected in the said other input circuit, a pair of rectifying circuits coupled to said selecting means, each of said rectifying circuits comprising a rectifier and a load circuit, and means for connecting the outputs of said rectifying circuits in series opposition, and means for coupling at least a portion of the signal in one of said input circuits to the other input circuit.

19. A signal receiver comprising a pair of amplifiers, each amplifier having input and output circuits, each of said input circuits comprising means for receiving a signal of a predetermined frequency, the selecting means of one control means selecting a signal having a frequency different from the frequency of the signal selected in the other control means, means for converting said selected signal into two opposing signals of substantially the same time relation and means for combining said opposing signals, and means for coupling said input circuits to each other.

20. A signal receiver comprising means for selecting a signal of a predetermined frequency, a first time constant circuit coupled to said selecting means, said circuit having a charging time greater than its discharge time, a second time constant circuit coupled to said selecting means, said second circuit having a charging time less than its discharging time, signal responsive means, and means connecting said first and second circuits in series opposition and to said signal responsive means.

21. A signal receiver comprising an input circuit, a first charging circuit connected to said input circuit and comprising a rectifier and a condenser connected in series, said first circuit having a predetermined charging time and a longer discharging time, a second charging circuit connected to said input circuit and comprising a rectifier and a condenser connected in series, said second circuit having charging and discharging times respectively longer and shorter than said first circuit, a vacuum tube amplifier having an input and means connecting said first and second circuits in series opposition to said input of said amplifier.

22. A signal receiver comprising an input circuit, a first charging circuit connected to said input circuit and comprising a rectifier and a condenser connected in series, said first circuit having a predetermined charging time and a longer discharging time, a tuned circuit tuned to a predetermined frequency and connected to said input circuit, a second charging circuit connected to said tuned circuit and comprising a first rectifier and a first condenser connected in series and a second rectifier and a second condenser connected in series, said series connected second rectifier and condenser being connected in parallel with said first condenser and the charging and discharging times of said second circuit being respectively longer and shorter than said first circuit, a vacuum tube amplifier having an input, means for biasing said amplifier connected thereto and means connecting said first and said second charging circuits in series opposition and connecting said input to the junction point between said second rectifier and condenser.

23. A signal receiver according to claim 22 wherein said means for biasing said amplifier comprises a source of substantially fixed potential connected in series with said first and said second charging circuits.

24. A signal receiver according to claim 22 further comprising a second tuned circuit connected to said input circuit, said second tuned circuit being adapted to reject signals at said predetermined frequency and to accept signals of other frequencies, rectifying means connected to said second tuned circuit and means connecting said rectifying means in series opposition with said second charging circuit.

THOMAS FREDERICK STANLEY HARGREAVES.
WILLIAM FREDERICK GOULD.

REFERENCES CITED

The following references are of record in the file of this patent:

UNITED STATES PATENTS

| Number | Name | Date |
|---|---|---|
| 2,310,749 | Ressler | Feb. 9, 1943 |
| 2,343,759 | Fairly | Mar. 7, 1944 |
| 2,401,404 | Bedford | June 4, 1946 |
| 2,402,058 | Loughren | June 11, 1946 |
| 2,403,540 | Meneley | July 9, 1946 |
| 2,424,961 | Bancroft | Aug. 5, 1947 |

FOREIGN PATENTS

| Number | Country | Date |
|---|---|---|
| 698,170 | Germany | Nov. 4, 1940 |
| 869,974 | France | Feb. 26, 1942 |